J. S. LLOYD.
Stump-Puller.
No. 228,088. Patented May 25, 1880.
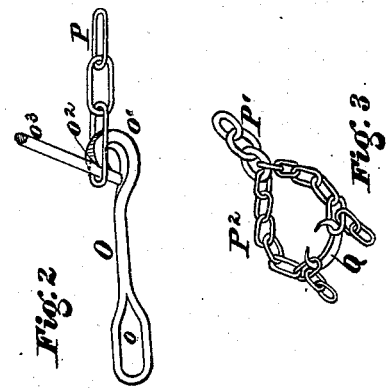
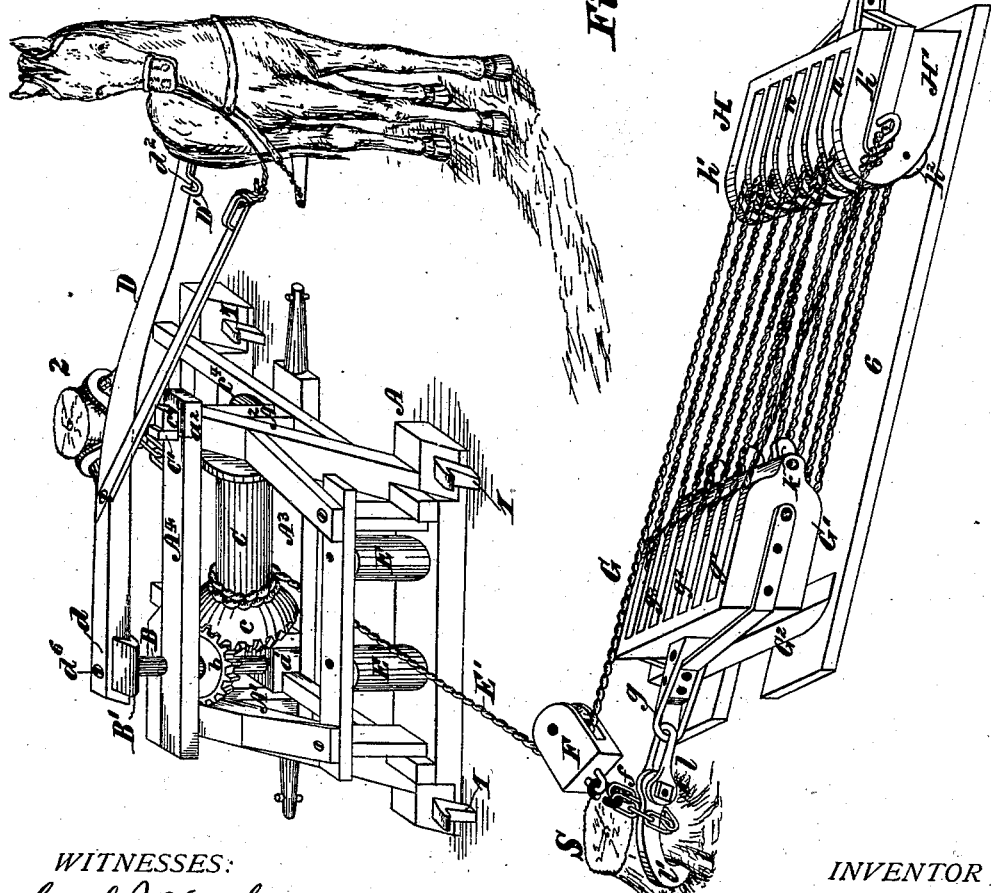
WITNESSES:
Saml. J. VanStavoren
Alex. Scott
INVENTOR
John S. Lloyd
By Connolly Bros.
ATTORNEYS.

J. S. LLOYD.
Stump-Puller.

No. 228,088.        Patented May 25, 1880.

WITNESSES:
Saml. J. VanStavoren
D. P. Cowl

INVENTOR,
John S. Lloyd,
By Connolly Bros,
ATTORNEYS.

UNITED STATES PATENT OFFICE.

JOHN S. LLOYD, OF FLEMINGTON, NEW JERSEY.

STUMP-PULLER.

SPECIFICATION forming part of Letters Patent No. 228,088, dated May 25, 1880.

Application filed August 6, 1879.

*To all whom it may concern:*

Be it known that I, JOHN S. LLOYD, of Flemington, in the county of Hunterdon and State of New Jersey, have invented certain new and useful Improvements in Stump-Pullers; and I do hereby declare the following to be a full, clear, and exact description of the invention, such as will enable others skilled in the art to which it pertains to make and use it, reference being had to the accompanying drawings, which form part of this specification, in which—

Figure 4:
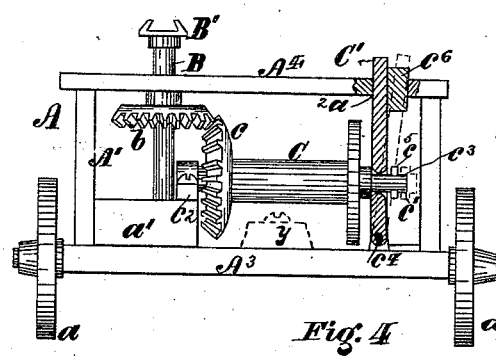
Figure 5:
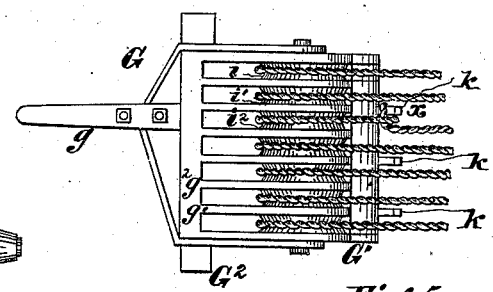
Figure 6:
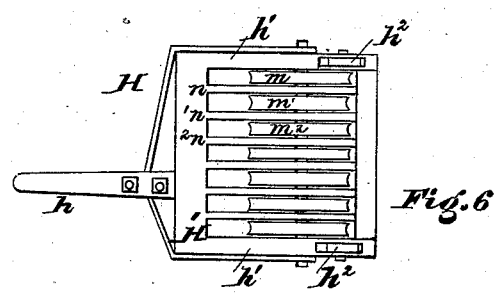
Figure 7:
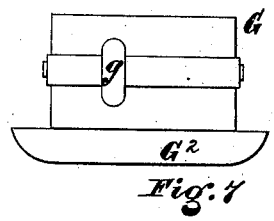
Figure 8:
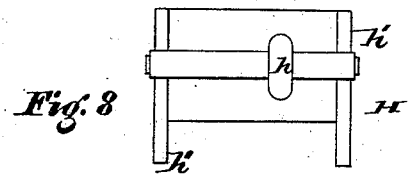
Figure 9:
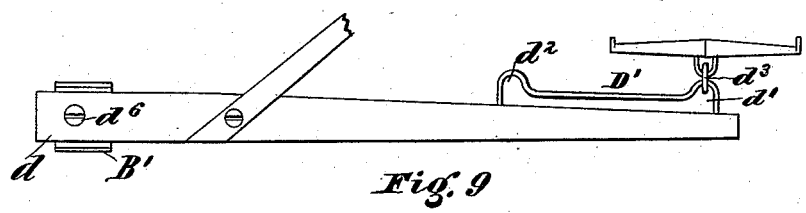

Figure 1 is a perspective of my invention, illustrating the mode of carrying the same into practice. Fig. 2 is a detail perspective of my improved link-bar. Fig. 3 is a detail perspective of my improved chain. Fig. 4 is a side elevation of the capstan, partly in section, and mounted upon wheels. Figs. 5 and 6 are plans of the multiple-sheave pulley-blocks. Figs. 7 and 8 are respectively end views of Figs. 5 and 6, and Fig. 9 is a plan of the capstan-lever.

My improvements have reference to capstan stump-pullers; and my invention consists in the peculiar construction and combination of parts, hereinafter set forth and specifically claimed.

Referring to the accompanying drawings, A indicates the frame of a capstan, the cross-beams of which may have journals to receive wheels $a\ a$, to facilitate the movement of said frame when required. When in position for operation said frame may be fastened to the ground by stakes 1, or anchored to a stump, 2, or be both staked and anchored.

$A'\ A^2$ are uprights connected by a cross-piece, $A^3$, and B is a vertical shaft, having a bevel-gear wheel, $b$, and dovetail socket $B'$, said shaft being journaled in one of the cross-beams $A^4$ and in the cross-piece $A^3$.

C is the winding-drum, one of the heads of which, $c$, is toothed, forming a gear-wheel, which meshes with the wheel $b$.

The shaft $c'$ of the drum C is journaled at one end in a box, $c^2$, fastened to a sill-piece, $a'$, its other end, $c^3$, being journaled in a shifting-lever, $C'$, which is pivoted at $c^4$ to the upright $A^2$, and extends upwardly through a slotted opening, $a^2$, in the cross-piece $A^3$.

$c^5$ is a pin, which passes through the shaft $c'$ outside of the lever $C'$, and $c^6$ is a key, which enters the slot $a^2$ and holds said lever in its adjusted position and the gear-wheel $c$ either in or out of gear, accordingly as said lever may have been moved. If said lever be moved toward the shaft B, occupying the position shown in full lines in the drawings, said wheels will be in gear. If moved in the contrary direction to occupy the position shown in dotted lines, the wheels will be out of gear, in which position the pulley-rope may be unwound from the drum C without turning the shaft B or causing the horse hitched to the capstan-lever to travel.

D is the capstan-lever, whose end $d$ fits in the dovetailed socket $B'$, and is there secured from end movement by a bolt or screw, $d^6$.

$D'$ is a rod secured to the capstan-lever by passing its two ends into said lever. Said rod is formed with offsets or bends $d'\ d^2$ at either end, and is provided with a ring, $d^3$, which is free to travel from one end of said rod to the other. The ring $d^3$ forms a connection for the single-tree, on which the horse employed in turning the capstan pulls.

When it is desired to exert the greatest possible power the ring $d^3$ fits in the bend $d'$. The horse then pulls on the end or about the end of the capstan-lever and travels in a large circle, moving the shaft B slowly.

When less power is required the ring $d^3$ may be moved into the offset $d^2$, and then the horse will walk in a much smaller circle and move the shaft B and drum C more quickly than before.

E E are guide-rollers, sustained in any suitable manner on the back end of the capstan-frame, as shown. The pulley-rope $E'$ passes between said rollers, and, as the distance between the latter is less than that between the drum-heads, said rope will be prevented from bearing against the latter, and thereby producing friction and chafing.

F represents a snatch-block, around the sheave of which the pulley-rope $E'$ passes, and G and H represent multiple-pulleys. $G'$ is the block of pulley G, having a shank or eye, $g$, located to one side of the middle of said block, or out of center or line of draft. Said shank, in practice, should be about double the length of the block, or, at least, of greater length than the latter, though it is shown shorter in the drawings. The block H' has a shank, h, similarly constructed and arranged.

The object of locating the shank or eye to one side of the middle or line of draft of pulley is to counteract the tendency in pulleys having two or more blocks to swing around to one side or out of the direct line of draft—a tendency which I conceive is owing to the fact that the strain on the first sheave over which the pulley-rope passes is greater than falls on any of the other sheaves, such strain diminishing progressively from each sheave backwardly to the last. The suggested lengthening of the shank or eye also assists in counteracting this tendency.

$g'$ $g^2$ $g^3$, &c., are cheeks or dividers separating the sheaves $i$ $i'$ $i^2$ $i^3$, &c., from each other, certain of these dividers having projections $k$ $k$, around which the pulley-rope may be looped or half-hitched, as shown at $x$, Fig. 5, when it is desired to disuse any of the pulleys.

The larger the number of pulleys used the greater will be the power exerted, and the distance required to be traveled by the horse will be correspondingly great. The greatest force required in pulling a stump, for example, will be required to start it or loosen its roots, and after this has been done less power is needed. Accordingly at the start all the sheaves may be free, and afterward any desired number of them may be locked or thrown into disuse by giving the pulley-rope a half-hitch around one of the projections $k$; or the same result may be accomplished by thrusting one of the link-bars into the swallow of the sheave where it is desired to begin the disuse.

$G^2$ is a shoe located on the under side of the block G', and transversely thereof, which serves to elevate said block from the ground and to facilitate its movement over the latter under draft or when being shifted. The block G' is anchored, as shown, when in operation, to a stump or other fixed object by means of a clevis, $l$, and hook or dog $l'$, or other suitable connection, and the snatch-block F is anchored to said clevis or hook (either or both) by means of a chain, $f$.

The outer cheeks, $h'$ $h'$, of the block H extend, as shown, a considerable distance below the peripheries of the sheaves $m$ and dividers $n$, forming runners, whereby said sheaves are prevented from touching the ground, serving also to elevate the pulley-rope a considerable distance above the ground, and preventing its rubbing or being chafed when slack. $h^2$ $h^2$ are rollers in said cheeks to facilitate shifting the pulley H.

O is a link-bar of the peculiar shape shown, which serves to connect the shank or eye $h$ with the stump or tree chain P. Said bar has an eye, $o$, at one end, and a hook, $o'$, at the other end, the tip end of said hook having a groove, $o^2$, to receive a crowbar or pin, $o^3$, to facilitate the drawing of one of the links of the chain P over said hook. The chain P is composed of a main chain, P', with two supplemental smaller chains, $P^2$ $P^2$, attached to the end link or ring of said main chain. The two supplemental chains are to be shirred around the tree or stump requiring to be pulled, their free ends being joined by a grapple, Q, a clevis, or equivalent fastening, the tree or stump (shown at 4, Fig. 1) being notched or channeled, as at 5, for said chains $P^2$ $P^2$. By means of this arrangement a much firmer grasp or hold of a tree, stump, or stone can be taken than where a single chain is shirred around the object to be pulled in the usual manner.

Where the tree or stump has laterally-spreading roots on the surface or a short distance below the same the chain may be passed beneath one of said roots, as shown in Fig. 1. The higher up the point of attachment of the chain to a stump the greater will be the pulling force exerted thereon.

To accomplish a result equivalent to a high point of attachment, I place a large block, R, on a stump or stone requiring to be pulled and carry the chain over the same, as shown in Fig. 1. By means of this provision I can pull out stumps much more firmly rooted in the ground than the stump S, to which the pulleys are anchored, whereas without the block the anchor-stump would require to be more firmly rooted than the others.

To protect the pulleys and ropes from dirt and wet the former should rest on planks 6 laid on the ground.

The operation is obvious. The capstan and pulleys G being anchored and the stump or tree chain P being made fast to the object to be pulled, a horse or other animal secured to the lever D is caused to give motion to the parts by walking around the capstan. The greatest force is usually required at the start, and hence the connection with the capstan-lever is first made at the outer extremity of the lever, and all the sheaves are left free to move.

After the stump or stone or tree is loosened the horse may be caused to travel in a smaller circle, and some of the pulleys cut out or disused in the manner already described, thus employing less force and moving more speedily to finish the pulling than was required at the beginning.

In moving the capstan-frame the wheels $a$ $a$ may be fitted on the cross-bars and the lever D secured, as shown by dotted lines $y$ $y$ in Fig. 4, to form a tongue, whereby the frame may be readily fastened to the rear of a wagon or other vehicle.

What I claim as my invention is—

1. The drum C, journaled in and in combination with the shifting-lever C', whereby the wheel $c$ of said drum may be moved into and out of gear, substantially as shown and described.

2. In combination with capstan-lever D, the rod D', having offsets or bends $d'$ $d^2$ and traveler $d^3$, substantially as shown and described.

3. A pulley-block having its shank or eye located to one side of the middle or line of draft or out of center, substantially as and for the purpose specified.

4. A multiple-sheave pulley-block the cheek or dividing plate or plates of which have a projection or projections, $k$, around which the pulley-rope may be looped or hitched, as and for the purpose set forth.

5. The pulley-block $G'$, having a transverse shoe, $G^2$, substantially as and for the purpose set forth.

6. The pulley-block H, having cheeks $h'\ h'$, extended beyond the perimeters of the sheaves in said block, to form runners and elevate said sheaves when the block is laid on the ground.

7. The link-bars O, having eyes $o$ and hooked ends $o'$, grooved at $o^2$, substantially as and for the purpose set forth.

8. The chain P, composed of main chain $P'$ and supplemental chains $P^2\ P^2$, with grapple, clevis, or equivalent connection for the free ends of latter, substantially as shown and described.

In testimony that I claim the foregoing I have hereunto set my hand this 1st day of August, 1879.

JOHN S. LLOYD.

Witnesses:
   AL. P. BURCHELL,
   M. D. CONNOLLY.